June 7, 1955 D. G. FAUST 2,710,073
AIR LINE LUBRICATOR
Filed Jan. 9, 1953
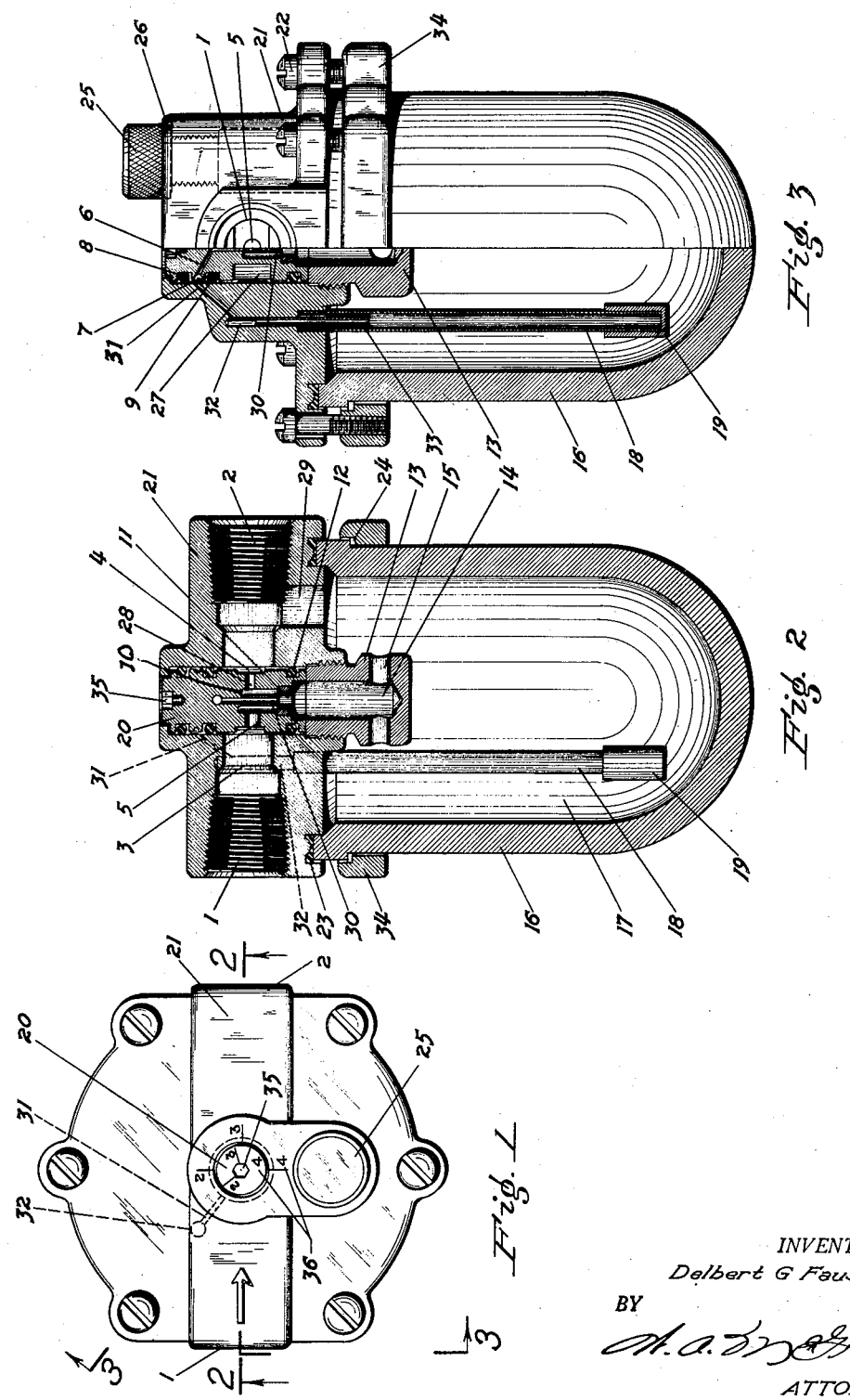
INVENTOR.
Delbert G Faust
BY
ATTORNEY : 2,710,073
Patented June 7, 1955

2,710,073

AIR LINE LUBRICATOR

Delbert G. Faust, Littleton, Colo., assignor to C. A. Norgren Co., Englewood, Colo., a corporation of Colorado Application January 9, 1953, Serial No. 330,544

3 Claims. (Cl. 184—55)

This invention relates to an aerosol generator and more particularly to an oil fog lubricator adapted to supply a fog or aerosol of lubricant to a compressed gas conduit.

Included among the objects and advantages of the present invention is an aerosol generator of simplified construction for producing a uniform distribution of lubricant into a compressed gas conduit under various operating conditions. The device of the invention provides an oil fog generator adaptable for various operating conditions and conduit sizes. Further, the device provides a one-variable adjustment control for ease of operation. The generator, also, is so constructed to facilitate servicing from either side of the device. Other objects and advantages will be apparent from the following description and illustrations in which:

Figure 1 is a top plan view of a device according to the invention,

Figure 2 is a cross-sectional elevation of the device of Figure 1 taken along section line 2—2, and Figure 3 is a partial cross-sectional elevation of the device of Figure 1 taken along sectional line 3—3.

In the embodiment selected for illustration, a fluid reservoir or bowl 16 is attached to a body 21 by means of screws 22 through the body into a clamp ring 34 encircling the reservoir. The reservoir 16 provides a volume 17 within the confines thereof, to store a quantity of fluid for disbursing into a stream of compressed gas passing through a compressed gas conduit. The body 21 has a threaded inlet 1 and threaded outlet 2 for connection into the compressed gas conduit. A passage 3 interconnects the inlet and the outlet, and is adapted to pass a flow of gas. A bore 4 in the body 21 is normal to and intersects the passage 3 intermediate the ends thereof. A venturi plug 20 fits in the bore 4 and is held in place by a diffusion plug 13.

The venturi plug 20 has an inlet 5 facing upstream and an outlet 28 exhausting downstream. A chamber 10 interconnects the inlet 5 and the outlet 28. A small passageway 6 extends from the side of the plug 20 adjacent the top thereof through a tube 30 passing through the chamber 10. The tube 30 terminates into a venturi throat 11, which exhausts into bore 14 of the diffusion plug. Lateral openings 15 intersect bore 14 and exhaust into the volume 17 of the reservoir 16. A slot 27 is provided in the plug 20 to by-pass a portion of the gas entering passage 3.

The plug is sealed in the bore 4 by an O ring seal 8 at the upper end thereof and an O ring seal 12 at the lower end thereof. An O ring seal 9 spaced apart from the O ring seal 8 provides an annular groove 7 which is interconnected with the passageway 6 in the plug 20. A small passageway 31 in the body intersects the annular groove 7. The annular groove 7 provides a manifold for communication between the passageway 31 and the passageway 6 no matter what position the plug 20 may be in. The passageway 31 intersects the upper end of a bore 32 in the body terminating on the reservoir side thereof. A tube 18 interconnected with the bore 32 provides supply means for fluid from the reservoir into the venturi plug. A tube 33 of small internal diameter which constricts the fluid supply line is inserted into bore 32 to meter the volume of oil passing therethrough. The free end of the tube 18 has a filter element 19 enclosing it to prevent particles of foreign material from entering the supply tube. A passage 29 provides an outlet from the reservoir to the outlet 2 in the body.

The plug 20 is rotatable in the bore 4. To facilitate rotation a slot or socket 35 is provided at the top thereof for easy accessibility of a wrench or turning tool. The by-pass 27 being a slot across one side of the plug goes from open to closed position by rotating the plug. The amount of air by-passing the plug may thus be controlled.

In one application, the device of the present invention has value in supplying a dispersion of finely divided oil particles into a stream of compressed air for lubricating various air-operated mechanisms. The generator is connected by means of the threaded connections into a compressed air conduit. The device is filled with lubricant through the port closed by a plug 25. The plug is seated on a gasket 26, to insure a tight seal. Air enters the device from the inlet 1 into passage 3 leading to the venturi plug 20. At the venturi plug the air is separated into three paths before it is ultimately joined at the outlet 2 with the oil dispersion therein. One path follows directly the passage 3, passing plug 20 through the by-pass 27, and into the outlet 2. A portion of the air follows a second path which is through the inlet 5 of the venturi plug into chamber 10 and through the outlet 28 of the plug into outlet 2 of the device. The outlet 28 is of smaller cross-sectional area than the inlet 5, so that only a portion of the air entering the inlet 5 is exhausted through the outlet 28. The third path is through inlet 5, chamber 10, venturi section 11, passages 14 and 15 to reservoir 17, passage 29 to outlet 2.

Air passing through this venturi section 11 creates an area of low pressure in the passage 6, drawing oil from the reservoir through the supply tube 18 and the interconnecting passages 32 and 31. The oil thus drawn through the supply system intermixes with the air in the throat 11, and the mixture is exhausted through passages 14 and 15 in the diffusion plug 13 into the reservoir space 17. Large particles of oil are removed from the air either by direction change in passages 15 of the diffusion plug, or by settling out in the low velocity chamber above the oil in the reservoir. The fine particles of oil or aerosol exhaust through passage 29 into the outlet 2 where all three air paths are joined together and exhausted to the compressed air conduit.

The by-pass 27 in the plug 20 provides means for varying the flow of air through the venturi section. By turning the plug the by-pass opening may be varied according to the requirements of the amount of air passing through the device. The by-pass opening is infinitely variable from open to closed position making very fine adjustment possible. The position of the by-pass determines the amount of lubricant delivered per unit volume of air passing through the generator. For convenience, a pair of scales 36 are provided on the plug and body to indicate the position of the plug.

Others may readily adapt the invention for use under various conditions of service, by employing one or more of the novel features disclosed or equivalents thereof. As at present advised with respect to the apparent scope of my invention, I desire to claim the following subject matter.

I claim:

1. A lubricator for compressed gas systems comprising a body, a container for lubricant associated with said body, a passage through said body, said passage having an inlet and an outlet for connection into a conduit, rotatable plug constricting means in said passage, variable by-pass means in said constricting means, a chamber in said constricting means, said chamber having an inlet on the upstream side of said passage, lubricant supply means inclusive of a manifold and a constricted lubricant line interconnecting said chamber and said container, venturi means interconnected with said chamber and said supply means whereby under the influence of a stream of gas passing through said venturi means lubricant is drawn from said container and dispersed in said gas stream, said venturi means exhausting into said container, an outlet from said chamber to the outlet of said passage, said outlet being of smaller cross-sectional area than the inlet to said chamber whereby only a portion of the gas entering said chamber exhausts through said outlet, and communicating means between said container and the outlet of said passage for intermixing gas-lubricant mixture with gas passing through said passage.

2. A lubricator for compressed gas systems comprising a body, a container for lubricant interconnected with said body, a gas passage through said body, said passage having inlet and outlet means for connection into a compressed gas conduit, a rotatable plug disposed in said passage, a venturi section in said plug having an inlet communicating with said passage inlet, a venturi outlet communicating with said container, a venturi suction inlet, said venturi suction inlet being interconnected with a lubricant supply manifold, lubricant supply means interconnecting said manifold and said container, said venturi outlet adapted to exhaust a mixture of lubricant and gas into said container, a by-pass interconnected with said plug and variable by rotation of said plug for passing a variable quantity of gas around said venturi section to provide a variable flow of lubricant to said venturi, and an opening from said container to the outlet of said passage.

3. A lubricator for compressed gas systems comprising a body, a container for lubricant interconnected with said body, a gas passage through said body, said passage having inlet and outlet means for connection into a compressed gas conduit, a rotatable plug disposed in constricting said passage, a venturi section in said plug having an inlet communicating with said passage inlet, a venturi outlet communicating with said container, a venturi suction inlet, said venturi suction inlet of said venturi being interconnected with a lubricant supply manifold in said body adjacent the top of said plug, lubricant supply means interconnecting said manifold and said container whereby a flow of gas through said venturi section draws lubricant from said container for admixing with gas in said venturi section and exhausting said mixture into said container, a by-pass interconnected with said plug and variable by rotation of said plug for passing a variable quantity of gas around said venturi section to provide a variable flow of lubricant to said venturi, and an opening from said container to the outlet of said passage.

References Cited in the file of this patent

UNITED STATES PATENTS

| 1,568,840 | Holmes | Jan. 5, 1926 |
| 1,909,021 | Slater | May 16, 1933 |
| 2,565,691 | Ketelsen | Aug. 28, 1951 |
| 2,613,067 | Goodyer | Oct. 7, 1952 |